United States Patent
Bacharouche

(10) Patent No.: US 11,890,834 B2
(45) Date of Patent: Feb. 6, 2024

(54) LAMINATED GLAZING FOR VEHICLES, PARTICULARLY MOTOR VEHICLES

(71) Applicant: SAINT-GOBAIN GLASS FRANCE, Courbevoie (FR)

(72) Inventor: Jalal Bacharouche, Clairoix (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/252,635

(22) PCT Filed: Nov. 9, 2021

(86) PCT No.: PCT/FR2021/051974
§ 371 (c)(1),
(2) Date: May 11, 2023

(87) PCT Pub. No.: WO2022/101573
PCT Pub. Date: May 19, 2022

(65) Prior Publication Data
US 2023/0339213 A1  Oct. 26, 2023

(30) Foreign Application Priority Data

Nov. 12, 2020 (FR) ...................................... 2011595

(51) Int. Cl.
*B32B 3/10* (2006.01)
*B32B 17/10* (2006.01)

(52) U.S. Cl.
CPC .. *B32B 17/10247* (2013.01); *B32B 17/10036* (2013.01); *B32B 17/10174* (2013.01);
(Continued)

(58) Field of Classification Search
None
See application file for complete search history.

(56) References Cited

U.S. PATENT DOCUMENTS

2017/0297310 A1* 10/2017 Mannheim Astete ...................... E06B 3/66304
2020/0290318 A1*  9/2020 Mannheim Astete ...................... B32B 17/1077

FOREIGN PATENT DOCUMENTS

WO  WO 2017/115041 A1  7/2017
WO  WO 2017/115042 A1  7/2017
(Continued)

OTHER PUBLICATIONS

Written Opinion of the International Searching Authority as issued in International Patent Application No. PCT/FR2021/051974, dated Feb. 23, 2022.

(Continued)

*Primary Examiner* — Christopher M Polley
(74) *Attorney, Agent, or Firm* — Pillsbury Winthrop Shaw Pittman LLP

(57) ABSTRACT

A laminated glazing for a vehicle, in particular a motor vehicle, includes an exterior glass sheet adhesively bonded to an interior glass sheet by a lamination interlayer, wherein the exterior glass sheet carries a layer of a first enamel, of black color, on the periphery of its face in contact with the lamination interlayer, known as face 2, and the interior glass sheet carries on its face in contact with the lamination interlayer, known as face 3, a layer of a second enamel forming a marking and having a color other than black, located opposite the layer of the first enamel, the laminated glazing further including a polymeric seal on the face of the interior glass sheet, called face 4, opposite face 3, the seal concealing the marking.

17 Claims, 3 Drawing Sheets

(52) U.S. Cl.
CPC .. *B32B 17/10302* (2013.01); *B32B 17/10348* (2013.01); *B32B 17/10761* (2013.01); *B32B 17/10807* (2013.01); *B32B 2307/4023* (2013.01); *B32B 2307/546* (2013.01); *B32B 2605/006* (2013.01)

(56) References Cited

FOREIGN PATENT DOCUMENTS

| WO | WO-2017115042 A1 | * | 7/2017 | ....... B32B 17/10036 |
| WO | WO 2017/203132 A1 | | 11/2017 | |
| WO | WO 2018/078278 A1 | | 5/2018 | |
| WO | WO-2021180749 A1 | * | 9/2021 | ....... B32B 17/10036 |

OTHER PUBLICATIONS

International Search Report as issued in International Patent Application No. PCT/FR2021/051974, dated Feb. 23, 2022.

* cited by examiner

[Fig. 1]
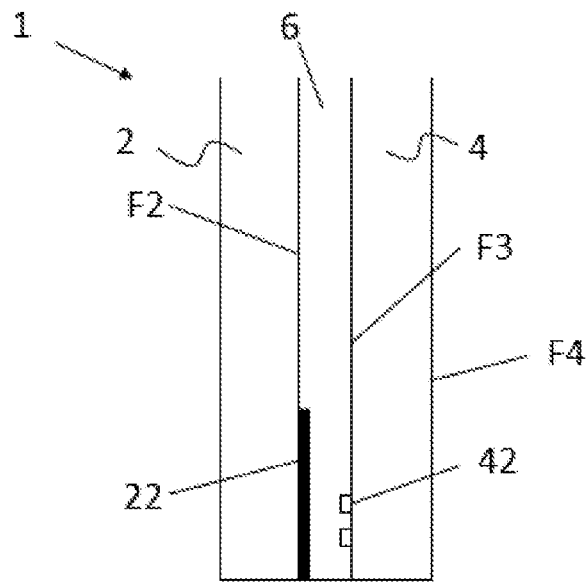
[Fig. 2]
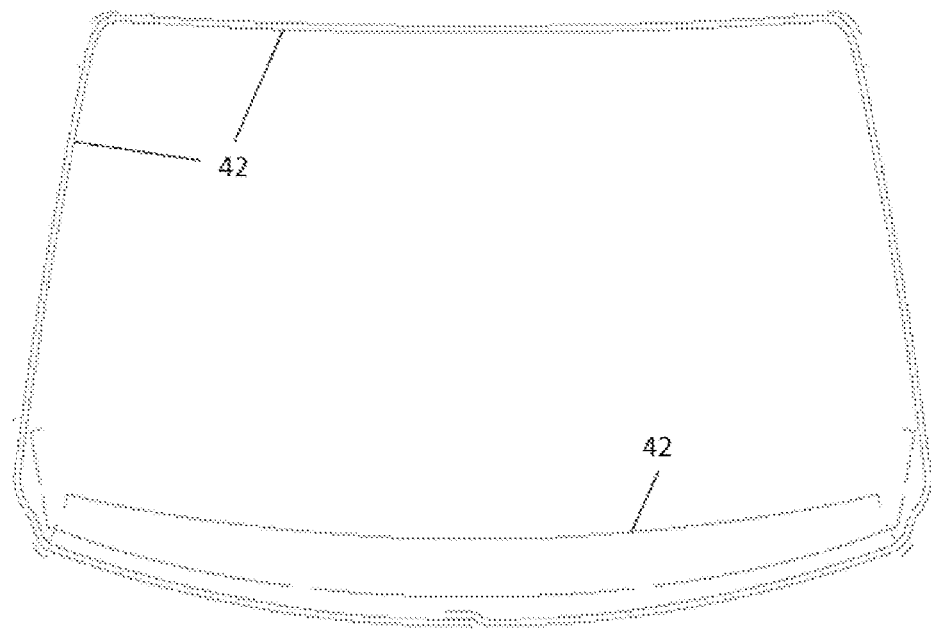

[Fig. 3]
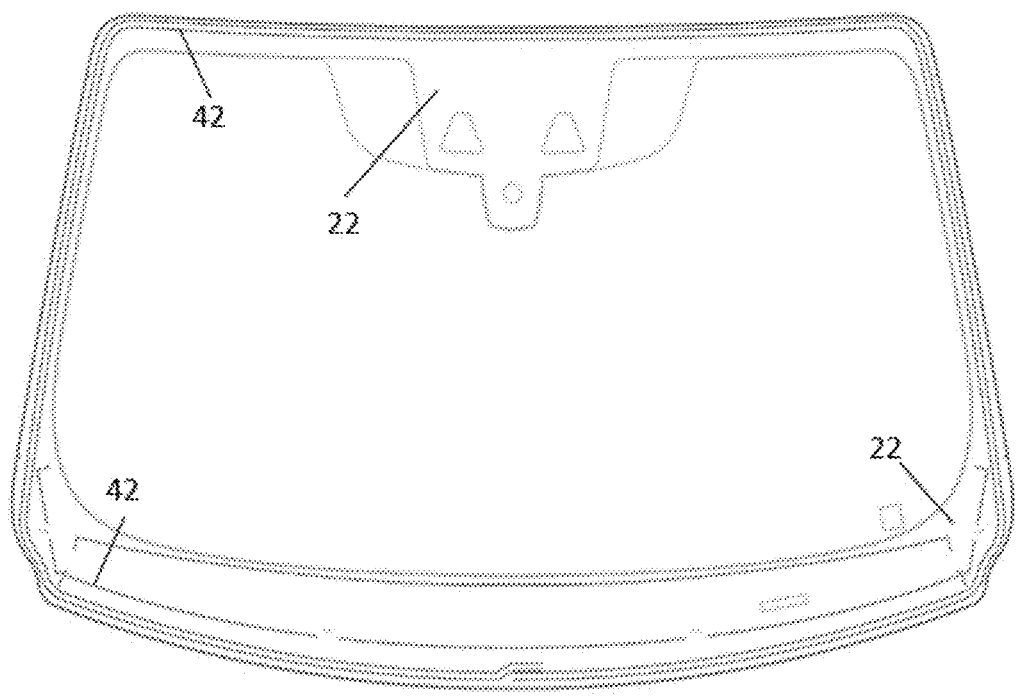
[Fig. 4]
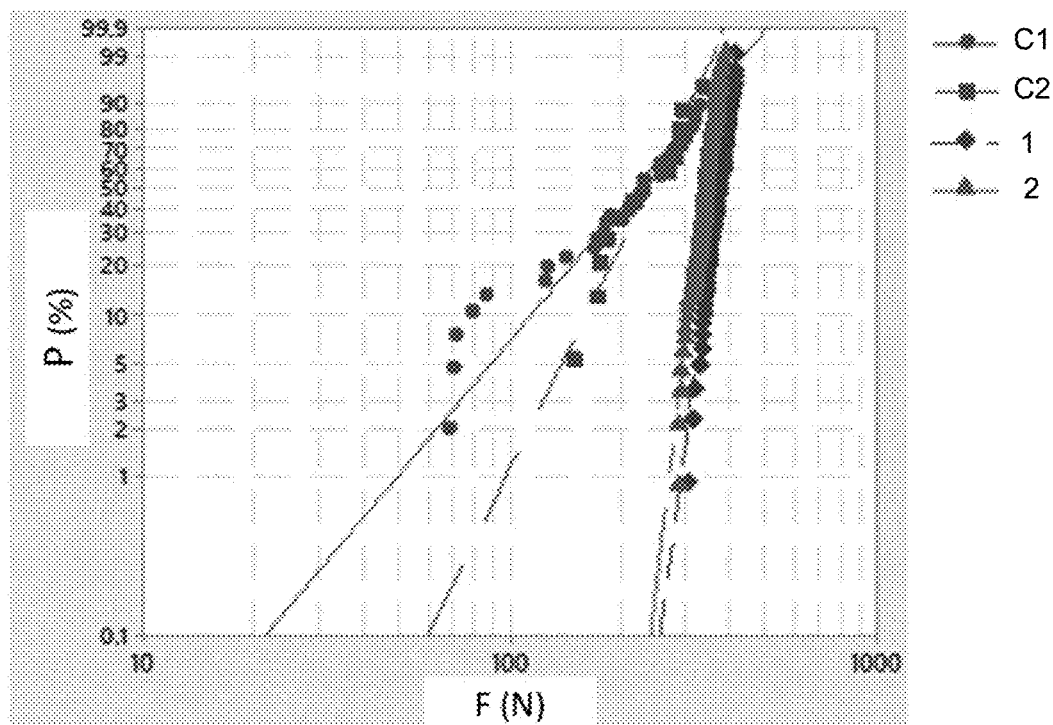

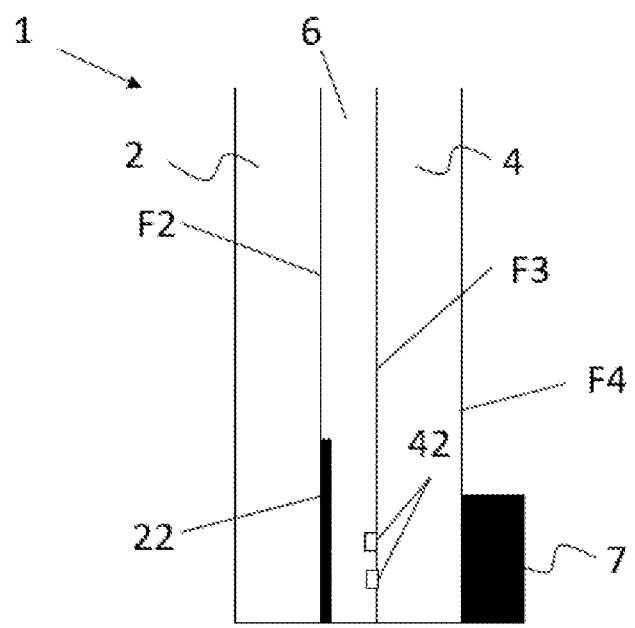
[Fig. 5]

LAMINATED GLAZING FOR VEHICLES, PARTICULARLY MOTOR VEHICLES

CROSS-REFERENCE TO RELATED APPLICATIONS

This application is the U.S. National Stage of PCT/FR2021/051974, filed Nov. 9, 2021, which in turn claims priority to French patent application number 2011595 filed Nov. 12, 2020. The content of these applications are incorporated herein by reference in their entireties.

The invention relates to the field of laminated glazing for vehicles, particularly motor vehicles. It concerns in particular windshields, but also laminated rear windows, laminated roofs, and laminated sides.

Laminated glazings comprise an exterior glass sheet adhesively bonded to an interior glass sheet by means of a lamination interlayer. Automotive glazings, such as windshields, are typically curved, so that the exterior sheet is located on the convex side of the glazing, and the interior sheet is located on the concave side of the glazing. Traditionally, the faces of the glass sheets of laminated glazings are numbered as follows: face 1 is the face intended to be located on the outside of the vehicle, face 2 is the inner face of the exterior glass sheet, thus in contact with the lamination interlayer, face 3 is the outer face of the interior glass sheet, also in contact with the lamination interlayer, and finally face 4 is the sheet intended to be located inside the vehicle.

The face 2 generally has an enamel layer around its periphery. This black enamel forms an opaque perimeter band to conceal the joints used to mount the glass in the bodywork opening and to protect them from ultraviolet radiation.

It can be useful for car manufacturers to place a marking on the glass to facilitate the application of the sealing bead by a robot, or to facilitate the installation of the glazing in the bodywork bay.

For this purpose, the object of the invention is a laminated glazing for a vehicle, in particular a motor vehicle, comprising an exterior glass sheet adhesively bonded to an interior glass sheet by means of a lamination interlayer, wherein the exterior glass sheet carries a layer of a first enamel, of black color, on the periphery of its face in contact with the lamination interlayer, known as face 2, and the interior glass sheet carries on its face in contact with the lamination interlayer, known as face 3, a layer of a second enamel forming a marking and having a color other than black, located opposite the layer of the first enamel, said laminated glazing further comprising a polymeric seal on face 4, said seal concealing said marking.

The laminated glazing is in particular a windshield, a roof, a rear window or a side window of a motor vehicle.

The invention also relates to a method for manufacturing such a laminated glazing. This method comprises:
- the deposition of a layer of a first enamel, of black color, on the periphery of one face of a glass sheet called exterior glass sheet,
- the deposition of a layer of a second enamel forming a marking and having a color other than black on one face of a glass sheet called interior glass sheet, then,
- pre-firing of the first and second enamel layers, then,
- bending the two glass sheets together, said interior glass sheet being disposed on top of said exterior glass sheet, the layer of the first enamel and the layer of the second enamel facing each other, and then
- the laminating of the two glass sheets by means of a lamination interlayer.

The marking, thus arranged on face 3, is visible through the interior glass sheet when the sealing bead is applied. Having another color than black, it is visible by contrast on the black background formed by the first enamel and can therefore be easily spotted by industrial robots.

In addition, the choice of an enamel for the marking was found to provide good mechanical properties as well as good aesthetics.

The glass sheets may be flat or curved. They are generally flat when the enamel layers are deposited and are subsequently curved.

The glass of the glass sheets is typically a soda-lime-silica glass, but other glasses, for example borosilicates or aluminosilicates, can also be used. The glass sheets are preferably obtained by the float method, that is by a method consisting in casting molten glass onto a bath of molten tin.

Preferably, at least one of the glass sheets is made of tinted glass, especially green, blue or gray. For this purpose, the total weight content of iron oxide in at least one of the glass sheets is preferably between 0.5 and 1.5%.

In the case of a windshield or front side window, the light transmittance of the glazing is preferably at least 70%, taking into account the illuminant A and the CIE-1931 reference observer. The total weight content of iron oxide in at least one of the glass sheets is preferably between 0.5 and 0.9%.

In the case of rear windows or roofs, or rear side windows, the light transmittance can be lower, especially between 5 and 50%, or even between and 40%. The total weight content of iron oxide in at least one of the glass sheets is preferably between 0.5 and 1.5%. At least one of the glass sheets may further comprise other coloring species, in particular cobalt and/or chromium oxides, or selenium.

The exterior and/or interior glass sheet has a thickness of preferably between 0.7 and 5 mm, in particular between 1 and 4 mm, or even between 1.5 and 3 mm.

The layer of first enamel preferably comprises a peripheral strip, that is a self-contained strip which, at any point of the periphery of the exterior glass sheet, extends toward the inside of the glass sheet over a certain width, typically of between 1 and 20 cm. The face 2 is preferably coated with the layer of first enamel over 2 to 25%, particularly 3 to 20%, or even 5 to 15% of the surface thereof.

The first enamel is black. It advantageously has a colorimetric coordinate $L^*$, in reflection on the glass side, of less than 10, in particular less than 5, and even less than 3.

The layer of the second enamel forms a marking. A marking means a decoration that serves as a reference point for a robot. This marking usually occupies a small area of the interior glass sheet. The layer of second enamel preferably coats between 0.05% and 5%, particularly between 0.1 and 3%, of the face 3 of the interior glass sheet.

This marking is located opposite the layer of first enamel. It is therefore not visible from the outside of the vehicle, but is clearly visible through the interior glass sheet, on the black background formed by the layer of the first enamel, when the seal is applied.

Preferably, the marking comprises at least one line or a plurality of patterns (for example, dots), located around the periphery of the interior glass sheet. The marking preferably forms a set of lines, each of the lines having a thickness between 0.2 and 2.0 mm, in particular between 0.3 and 1.0 mm, typically around 0.5 mm.

The marking is preferably intended to form a reference point for the deposition of the polymeric seal on face 4 (the face of the interior glass sheet opposite the face 3).

The glazing also comprises a polymeric seal on face 4, said seal concealing said marking. The seal is located on face 4 and therefore conceals the marking from the inside of the vehicle. The marking is therefore not visible in the final glazing, neither from inside the vehicle nor from the outside. This seal is typically in the form of a bead arranged on at least a part of the periphery of the glazing. The seal is typically based on polyurethane.

The method therefore preferably comprises a step of depositing, with the help of an industrial robot, a seal on the face of the interior glass sheet opposite the face bearing the layer of second enamel. This step will usually be implemented by the automaker.

The second enamel can have any color other than black, for example red, blue, yellow, green etc. Preferably the second enamel is white, to ensure the best contrast with the black background of the first enamel. The enamel preferably has the following colorimetric coordinates (illuminant D65, CIE-1931 reference observer): L* from 40 to 85, in particular from 50 to 80, a* and b* each from −20 to +20, in particular from −10 to +10, or from −5 to +5.

The enamel layers are preferably formed from a composition comprising at least one pigment and at least one glass frit. After firing, the glass frit forms a vitreous or glass-crystalline (partially vitreous and partially crystallized) binder that fixes the pigments on the surface of the glass sheet.

The enamel layers preferably do not comprise lead oxide.

The enamel compositions generally further comprise an organic medium, intended to facilitate the application of the composition on the glass sheet and also the temporary adhesion thereof to same, and which is eliminated during the firing of the enamel. The medium typically comprises solvents, diluents, oils and/or resins.

In the present text, "enamel composition" is used to describe the liquid composition which is used to deposit a wet enamel layer on the glass sheet. The term "enamel layer" is used to describe the final layer, after firing, while the term "wet enamel layer" is used to describe the enamel layer before firing.

Preferably, the first and second enamels comprise a bismuth borosilicate-based glass or glass-crystalline binder. Thus, the enamel composition preferably comprises, for both the first and the second enamel, a glass frit based on such a glass.

More particularly, the glass binder of the enamel layer (or the glass frit of the enamel composition) advantageously has a chemical composition comprising the following oxides, in contents by weight which vary within the limits mentioned below:

| | |
|---|---|
| $B_2O_3$ | 2-30% |
| $SiO_2$ | 5-30% |
| $Bi_2O_3$ | 20-60% |
| ZnO | 0-20%. |

The use of such a frit avoids, during the bending process, any sticking of the glass sheets to one another, as well as any diffusion of species between the two enamel layers.

Preferably, the first and second enamels comprise the same glass or glass-crystalline binder (and therefore the same glass frit in the case of the enamel composition). In this case, only the pigments differ between the two enamel layers. This solution optimizes the mechanical resistance properties of the glazing.

The pigments are chosen based on the target color.

For the layer of the first enamel, the pigments preferably comprise one or more oxides selected from oxides of chromium, copper, iron, manganese, cobalt, nickel. These may be, by way of example, copper and/or iron chromates. These pigments give a black tint. For the white color, titanium oxide pigments, especially rutile, are preferred.

The layer of first enamel and the layer of second enamel are preferably deposited by screen-printing an enamel composition. To this end, a screen printing screen is placed on the glass sheet, which screen comprises meshes, some of which are blocked off, then the enamel composition is deposited on the screen, then a squeegee is applied in order to force the enamel composition through the screen in the zones where the screen meshes have not been blocked off, so as to form a wet enamel layer. According to another embodiment, the layer of second enamel, or even the layer of first enamel, is deposited by a digital printing technique, for example by inkjet.

The enamel layers are then pre-fired, preferably at a temperature of 500 to 650° C., especially 550 to 600° C. The pre-firing first removes the solvent and medium from the enamel composition and then partially crystallizes the enamel, thus preventing the two glass sheets from sticking together during bending.

The enamel layers are then fired, preferably at a temperature of at least 550° C. and even 600° C., and at most 700° C. The enamel layers are normally fired during the bending of the glass sheets.

The thickness of the enamel coatings, after the heat treatment step, is preferably within a range extending from 5 to 30 μm, in particular from 8 to 20 μm.

Preferably, a low-emissive or solar control coating is arranged on face 3, under the layer of second enamel.

This coating is notably a stack of thin layers.

The normal emissivity of this coating, measured at ambient temperature, is preferably greater than 0.50, in particular 0.30 and even 0.20 or 0.10.

The stack of thin layers is preferably in contact with the interior glass sheet. When being deposited, the layer of second enamel is preferably in contact with the stack of thin layers.

In the present text, "contact" is intended to mean physical contact. The expression "based on" is preferably intended to mean the fact that the layer in question comprises at least 50% by weight of the material in question, particularly 60%, or even 70% and even 80% or 90%. The layer may even substantially consist of, or consist of, this material. "Substantially consist of" should be understood to mean that the layer may comprise impurities which have no influence on its properties. The terms "oxide" or "nitride" do not necessarily mean that the oxides or nitrides are stoichiometric. Indeed, they may be substoichiometric, superstoichiometric or stoichiometric.

The stack preferably comprises at least one layer based on a nitride. The nitride is particularly a nitride of at least one element selected from aluminum, silicon, zirconium, titanium. It may comprise a nitride of at least two or three of these elements, for example a silicon zirconium nitride or a silicon aluminum nitride. The layer based on a nitride is preferably a layer based on silicon nitride, more particularly a layer consisting substantially of a silicon nitride. When the layer of silicon nitride is deposited by cathode sputtering, it generally contains aluminum because it is common practice to dope silicon targets with aluminum in order to accelerate the deposition rates.

The layer based on a nitride preferably has a physical thickness in a range extending from 2 to 100 nm, particularly from 5 to 80 nm.

The layers based on nitride are commonly used in a large number of stacks of thin layers since they have advantageous blocking properties, in that they prevent the oxidation of other layers present in the stack, particularly functional layers which will be described below.

The stack preferably comprises at least one functional layer, particularly an electrically conductive functional layer. The functional layer is preferably included between two thin dielectric layers, at least one of which is a layer based on nitride. Other possible dielectric layers are for example layers of oxides or oxynitrides.

At least one electrically conductive functional layer is advantageously selected from:
  metal layers, particularly made of silver or niobium, or even gold, and
  layers of a transparent conductive oxide, particularly selected from indium tin oxide, doped tin oxides (for example doped with fluorine or antimony), doped zinc oxides (for example doped with aluminum or gallium).

These layers are particularly valued for their low emissivity, which gives the glazings excellent thermal insulation properties. In glazings equipping motor vehicles, low-emissivity glazings make it possible, in hot weather, to outwardly reflect part of the solar radiation, and therefore to limit the heating of the passenger compartment of said vehicles, and where appropriate to reduce air-conditioning costs. Conversely, in cold weather, these glazings make it possible to retain the heat within the passenger compartment, and consequently to reduce the heating energy required. The same applies in the case of glazings equipping buildings.

According to a preferred embodiment, the stack of thin layers comprises at least one layer of silver, particularly one, two, three, or even four layers of silver. The physical thickness of the layer of silver or, where appropriate, the sum of the thickness of the layers of silver, is preferably between 2 and 50 nm, particularly between 3 and 40 nm.

In order to protect the or each electrically conductive thin layer during the bending step, each of these layers is preferably surrounded by at least two dielectric layers. The dielectric layers are preferably based on oxide, nitride and/or oxynitride of at least one element selected from silicon, aluminum, titanium, zinc, zirconium, tin.

At least part of the stack of thin layers can be deposited by various known techniques, for example chemical vapor deposition (CVD), or by cathode sputtering, particularly magnetic-field-assisted (magnetron method).

The stack of thin layers is preferably deposited by cathode sputtering, particularly magnetron sputtering. In this method, a plasma is created in a high vacuum close to a target comprising the chemical elements to be deposited. By bombarding the target, the active species of the plasma tear off said elements, which are deposited on the glass sheet, forming the desired thin layer. This method is called a "reactive" method when the layer is made of a material resulting from a chemical reaction between the elements torn off from the target and the gas contained in the plasma. The major advantage of this method lies in the possibility of depositing a very complex stack of layers on the same line by making the glass sheet run in succession beneath various targets, generally in the same device.

The abovementioned examples have properties of electrical conduction and infrared reflection which are of use for providing a heating function (defrosting, defogging) and/or a thermal insulation function.

When the stack of thin layers is intended to provide a heating function, supplies of current must be provided. This may particularly be strips of silver paste deposited by screen printing on the stack of thin layers, at two opposite edges of the glass sheet.

After the enamel layers are deposited, the glass sheets are curved.

Bending can be carried out using gravity, for example (the glass deforms under its own weight) or through pressing, at temperatures typically ranging from 550 to 680° C.

Preferably, the two glass sheets (interior and exterior) are curved together. The glass sheets are preferably kept apart by placing an intercalated powder between them to ensure a gap of a few tens of micrometers, typically 20 to 50 μm. The interlayer powder is for example based on calcium and/or magnesium carbonate.

During the bending, the interior glass sheet is normally placed above the exterior glass sheet.

The step of lamination may be carried out by treatment in an autoclave, for example at temperatures from 110 to 160° C. and under a pressure ranging from 10 to 15 bar. Prior to the autoclave treatment, the air trapped between the glass sheets and the lamination interlayer can be eliminated by calendering or by applying negative pressure.

The lamination interlayer preferably comprises at least one sheet of polyvinyl acetal, particularly polyvinyl butyral (PVB).

The lamination interlayer can be tinted or untinted in order, if necessary, to regulate the optical or thermal properties of the glazing.

The lamination interlayer may advantageously have acoustic absorption properties in order to absorb airborne or structure-borne sounds. To this end, it may particularly consist of three polymeric sheets, including two "external" PVB sheets surrounding an internal polymeric sheet, optionally made of PVB, with a lower hardness than that of the outer sheets.

The lamination interlayer may also have thermal insulation properties, in particular properties of infrared radiation reflection. To this end, it may comprise a coating of thin layers with low-emissivity, for example a coating comprising a thin layer of silver or a coating alternating dielectric layers with different refractive indices, deposited on an internal PET sheet surrounded by two external PVB sheets.

The thickness of the lamination interlayer is generally within a range extending from 0.3 to 1.5 mm, particularly from 0.5 to 1 mm. The lamination interlayer can have a smaller thickness on an edge of the glazing than at the center of the glazing in order to prevent the formation of a double image in the case of using a head-up display (HUD).

EXAMPLES

The following examples, as well as FIGS. 1 to 5 below, illustrate the invention in a non-limiting manner.

FIG. 1 and FIG. 5 show a cross-section of a portion of a glazing according to the invention.

FIG. 2 shows the marking deposited on face 3.

FIG. 3 shows the marking deposited on face 3 and the outline of the enamel layer deposited on face 2.

FIG. 4 shows 3-point bending strength results.

FIG. 1 shows a cross-section of a portion of a glazing 1 according to the invention, more particularly a windshield, near an edge, so that the curvature of the glazing is not shown. The thicknesses of the glazing components are deliberately not shown to scale, in order to make them visible. As shown in FIG. 1, the exterior glass sheet 2 is adhesively bonded to the interior glass sheet 4 by means of a lamination interlayer 6, typically made of PVB (polyvinyl butyral). The face 2, denoted F2 on the figure, carries at the periphery of the glass a layer of enamel 22 forming a black opaque band. The face 3 of the glass, F3, carries a marking 42 in the form of a layer of enamel, here of white enamel and forming two parallel lines, typically of the order of 0.5 mm in width, opposite the enamel layer 22. Seen from the inside, the marking 42 is perfectly visible on the black background formed by the enamel 22, through the interior glass sheet 4, before a seal is applied.

FIG. 5 also shows, in a schematic way, a polymeric seal 7 placed on the face F4, and concealing the marking 42. The marking is thus no longer visible, neither from inside the vehicle, due to the seal 7, nor from outside the vehicle, due to the enamel 22.

FIG. 2 shows a particular example of a marking 42, in the form of a set of lines, forming a reference point for the subsequent deposition of the adhesive seal. Two parallel lines are deposited on the periphery of the interior glass sheet 4, plus a few additional lines in the lower part of the glass (in this case a windshield). The marking is formed by silk-screening a layer of white enamel. Each line in this example is 0.5 mm wide.

FIG. 3 shows the marking 42 of FIG. 2 and an enamel layer 22 superimposed. For the latter, only the outer contour of the enamel is shown, the enamel being deposited from the edge of the exterior glass sheet to the contour shown. FIG. 3 thus shows that the enamel 22 is capable of concealing the marking 42 in the final windshield.

Windshields were fabricated with the enamel designs shown in FIG. 3.

The exterior glass sheet, 2.6 mm thick, was made of green glass comprising as coloring species about 0.9% by weight of iron oxide. The interior glass sheet, 2.1 mm thick, was made of clear glass (0.1 wt % iron oxide) coated on the side intended to become face 3 with a stack of thin solar control layers comprising silver layers as functional layers.

The enamel band 22 was deposited on one side of the exterior glass sheet by screen-printing a black enamel composition (Ferro 14331) comprising a bismuth borosilicate glass frit. The wet enamel thickness was 15 μm.

In the comparative examples, the marking on face 3 was achieved by screen-printing a silver paste (SP1998C), comprising silver particles and a glass frit.

In the examples according to the invention, the marking was made by screen-printing a white enamel composition (PMI DV778380) comprising a bismuth borosilicate glass frit and white pigments. The wet enamel thickness was 18 μm.

After pre-firing (at 580° C.) the glass sheets were bent together (at 600° C.).

The assembly was then laminated with a 0.76 mm-thick PVB interlayer.

In the case of the silver paste marking, a transfer of silver from face 3 to face 2 during the bending process was observed, creating aesthetic defects visible from face 1, thus as a mechanical embrittlement, as shown by the mechanical tests below. On the other hand, in the case of the examples according to the invention, no aesthetic defect is observed, and in particular no white mark is visible from the face 1.

Mechanical tests in 3-point bending were also carried out.

FIG. 4 is a graph representing the probability of rupture (denoted P and expressed in %) as a function of the force (denoted F and expressed in Newtons) for the two comparative tests (C1, C2) where the marking was based on silver paste, and for two tests according to the invention (denoted 1 and 2).

It is clear from this figure that the choice of a marking according to the invention improves the mechanical strength of the windshield very significantly.

The invention claimed is:

1. A laminated glazing for a vehicle, comprising an exterior glass sheet adhesively bonded to an interior glass sheet by means of a lamination interlayer, wherein the exterior glass sheet includes a first face and carries a layer of a first enamel, of black color, on a periphery of a second face in contact with the lamination interlayer, the second face being opposite the first face, and the interior glass sheet carries on a third face in contact with the lamination interlayer, a layer of a second enamel forming a marking and having a color other than black, located opposite the layer of the first enamel, said laminated glazing further comprising a polymeric seal on a fourth face of the interior glass sheet, which is opposite the third face, said polymeric seal concealing said marking.

2. The laminated glazing according to claim 1, wherein the marking comprises at least one line or a plurality of patterns, located at a periphery of the interior glass sheet.

3. The laminated glazing according to claim 1, wherein the marking is adapted to form a reference point for the deposition of the polymeric seal on the fourth face.

4. The laminated glazing according to claim 1, wherein the first enamel has a colorimetric coordinate L* in reflection on the glass side lower than 10.

5. The laminated glazing according to claim 1, wherein the second enamel is white in color.

6. The laminated glazing according to claim 1, wherein the layer of second enamel coats between 0.05% and 5% of the third face of the interior glass sheet.

7. The laminated glazing according to claim 1, wherein the first and second enamels comprise a bismuth borosilicate-based glass or glass-crystalline binder.

8. The laminated glazing according to claim 7, wherein the first and second enamels comprise a same glass or glass-crystalline binder.

9. The laminated glazing according to claim 1, wherein a low-emissive or solar control coating is disposed on the third face, under the layer of the second enamel.

10. The laminated glazing according to claim 1, wherein the polymeric seal is in the form of a bead deposited on at least part of the periphery of the glazing.

11. The laminated glazing according to claim 1, wherein the polymeric seal is polyurethane-based.

12. The laminated glazing according to claim 1, which is a windshield, a roof, a rear window, or a side window, of the vehicle.

13. The laminated glazing according to claim 1, wherein the vehicle is a motor vehicle.

14. The laminated glazing according to claim 6, wherein the layer of second enamel coats between 0.1% and 3% of the third face of the interior glass sheet.

15. A method for manufacturing the laminated glazing according to claim 1, comprising:
  depositing a layer of a first enamel, of black color, on the periphery of one face of a glass sheet forming an exterior glass sheet, depositing a layer of a second enamel forming a marking and having a color other than black on one face of a glass sheet forming an interior glass sheet, then, pre-firing of the first and second enamel layers, then, bending the exterior and interior glass sheets together, said interior glass sheet being disposed on top of said exterior glass sheet, the layer of the first enamel and the layer of the second enamel facing each other, and then, laminating the exterior and interior glass sheets by means of a lamination interlayer.

16. The method according to claim 15, wherein the layer of the first enamel and the layer of the second enamel are deposited by screen-printing an enamel composition or by a digital printing technique.

17. The method according to claim 15, comprising depositing, with the help of an industrial robot, a seal on a face of the interior glass sheet opposite a face bearing the layer of the second enamel.

\* \* \* \* \*